United States Patent
Juda et al.

[15] 3,640,774
[45] Feb. 8, 1972

[54] METHOD OF INCREASING FUEL CELL CURRENT DENSITY

[72] Inventors: Walter Juda, Lexington; Robert J. Allen, Saugus; Henry G. Petrow, Cambridge, all of Mass.

[73] Assignee: Prototech Co., Division of Bolt Beranek and Newman Inc., Cambridge, Mass.

[22] Filed: Oct. 9, 1967

[21] Appl. No.: 673,951

[52] U.S. Cl. ................................................................136/86
[51] Int. Cl. ......................................................H01m 27/22
[58] Field of Search....................................................136/86

[56] References Cited

UNITED STATES PATENTS

| 3,252,837 | 5/1966 | Satterfield et al. | 136/86 |
| 3,393,098 | 7/1968 | Hartner et al. | 136/86 |
| 3,433,675 | 3/1969 | Moulton | 136/86 |
| 1,225,175 | 5/1917 | Reed | 136/86 |
| 3,180,762 | 4/1965 | Oswin | 136/86 |
| 3,207,682 | 9/1965 | Oswin et al. | 136/86 X |
| 3,252,837 | 5/1966 | Satterfield et al. | 136/86 |
| 3,291,643 | 12/1966 | Oswin et al. | 136/86 |
| 3,337,368 | 8/1967 | Oswin | 136/86 |
| 3,368,922 | 2/1968 | Salyer | 136/86 |
| 3,471,332 | 10/1969 | Allen et al. | 136/86 |
| 3,471,335 | 10/1969 | Moulton et al. | 136/86 |

*Primary Examiner*—Allen B. Curtis
*Attorney*—Rines and Rines

[57] ABSTRACT

The disclosure involves a method of increasing the current density (for a given voltage) in an electrochemical cell having a hydrogen-permeable anode layer, that comprises preactivating the layer before operating the same in the electrolytic medium while insuring sufficient cathode performance or activity during such operation.

4 Claims, No Drawings

METHOD OF INCREASING FUEL CELL CURRENT DENSITY

The present invention relates to method of increasing the current density of electrochemical cells and more particularly, though not exclusively, to such improved operation in fuel cells and the like employing high-temperature molten electrolytic media in which continuous peroxide and superoxide formation is attained through appropriate agitation in the cathode region of the cell. In copending application of Robert Novack, David Moulton and Walter Juda, Ser. No. 539,768, filed Apr. 4, 1966, now U.S. Pat No. 3,471,334, for Fuel Cell Process and Apparatus, a preferred cell of the above-described character is disclosed comprising, preferably, an alkaline-hydroxide, molten substantially anhydrous electrolytic medium provided with a palladium-containing hydrogen-permeable, but otherwise impervious anode, a cathode such as nonporous nickel which may, indeed, comprise the cell housing, and an oxygen inlet that enables agitation of the medium in the region of the cathode to produce peroxide and superoxide formation in such region, which serves as substantially the sole electrochemical oxidant, and with an electrolytic-medium ion-permeable barrier preferably interposed between the anode and cathode of sufficient dimensions and sufficiently restricted porosity to minimize the transfer of agitation from the cathode region of the cell to the anode region. Such cells are preferably operated above about 350° C. in the region of 400°–600° C., and oxygen and air (hereinafter generically referred to as oxygen) is bubbled into the cathode region, usually through a nickel or other tube disposed within the electrolytic medium at such region.

In such cells, increased cathode activity or performance can be attained with the addition of certain additives such as oxidizable metals selected from that group of transition metals capable of catalyzing peroxide and superoxide formation or utilization in the electrolytic medium, and capable of increasing utilization of the oxygen bubbled into the medium, as described in copending application of Robert Allen, Robert Novack and Henry Petrow, Ser. No. 659,296, filed Aug. 9, 1967 for Method of Increasing Oxygen Utilization and Simultaneously Increasing Power Density in Electrochemical Cells and the Like, now U.S. Pat. No. 3,471,332 granted Oct. 7, 1969.

An object of the present invention is to provide a new and improved method of increasing the current and power density of such fuel cells and other electrochemical cells through appropriate preactivation of the anode under conditions where sufficient cathode activity or performance is simultaneously insured. In summary, this end is attained by preactivating the anode prior to the continual operation of the cell and adjusting the area of the cathode to be sufficiently great to provide sufficient cathode activity to accommodate the effects of the preactivation of the anode.

While attempts have heretofore been made to preactivate an anode, no significant improvement of a cell of the above-described character was found until it was discovered that it is simultaneously essential to provide sufficient cathode activity or performance as well (as by insuring sufficient cathode area relative to the anode and/or sufficient additives for improving cathode operation).

Other and further objects of the invention are set forth hereinafter in the appended claims.

Returning to the type of cells described in the said copending applications and summarized above as illustrative, though not restricted to, the application of the present invention, anode and cathode performance are not independent. While high peroxide and superoxide concentration in the electrolyte improves cathode performance, it also tends to decrease anode performance with regard to fuel efficiency (i.e., ratio of cell output current to the coulomb-equivalence of hydrogen fuel fed to the anode per second). Further, in general, anode and cathode areas are closely spaced and of the same magnitude, as otherwise the electrolyte resistance tends to become a serious limiting factor. It has now been unexpectedly found, to the contrary, that both cathode and anode activity can be improved simultaneously without adverse effect by simultaneous activation of the anode and increased cathode area, or sites of anode surface and/or increased electrolyte activity, as with the aid of the before-mentioned additives.

As a first example, reference is made to an alkaline hydroxide cell as above described, having a molten, substantially anhydrous electrolytic medium comprising 90 parts potassium hydroxide and 10 parts sodium hydroxide, maintained at a temperature of about 475° C., and provided with a hydrogen-pervious, but otherwise impermeable palladium anode layer about 2 mils thick and about 66.9 cm.$^2$ in area, and an air or oxygen cathode comprising a nickel cathode surface of about four times the effective anode area. When oxygen (as in the form of air) is bubbled near the cathode region at a rate of about 2 liters/min. and when about 200 mg. of manganese dioxide additive are added to about 500 grams of the electrolyte, a current density of the order of 202 ma./cm.$^2$ at 0.68 volts between anode and cathode has been obtained.

By chemically depositing palladium black on the surface of the anode opposite the surface contacting the electrolytic medium and to which the hydrogen fuel gas is applied, a high-porosity increased surface area or site deposit was produced that served as the preactivation of the anode prior to the application of the hydrogen gas. The use of this preactivated anode with the said cathode of substantially greater effective surface area above-mentioned, produced the startling result of a more than 50 percent increase in the current density to 307 ma./cm.$^2$ at the anode (at 0.68 volts) in the otherwise identical cell and with an increase in hydrogen fuel efficiency of from about 40 to 50 percent to about 65 to 75 percent.

As another example, preactivation of the anode in the same cell was effected by oxidizing the same by flaming in the atmosphere prior to introducing the anode into the electrolytic medium of the cell. When introduced into the cell and exposed to the application of the hydrogen fuel, the oxidized layer on the anode apparently became reduced providing an increased anode area or increased active site surface that was found to give rise to an increased current density of 298 ma./cm.$^2$ (at 0.68 volts) in the otherwise unchanged cell and with the same hydrogen fuel efficiency increase before-mentioned.

As still another illustration, preactivation has been attained by oxidizing the palladium anode in an air furnace at about 800° C. The preactivated anode thus attained when inserted in the same cell above-described, was found to enable the achieving of an increased current density of 275 ma./cm.$^2$, at the same 0.68 volts, and with the same above-stated fuel efficiency increase.

Other tests have shown that such anode preactivation can produce these novel results with effective cathode-anode area ratios of from about 2 to 10.

Clearly the advantages of the invention are useful with other types of cells, as well, and further modifications will also occur to those skilled in the art, all such being considered to fall within the spirit and scope of the invention as defined in the appended claims.

What is claimed is:

1. A method of operating a fuel cell with increased current density by simultaneous enhancement of anode and cathode activity, which comprises providing an alkali-metal hydroxide electrolytic medium, maintaining the medium at a temperature in excess of about 350° C. and sufficient to render the medium molten and substantially anhydrous and in contact with an oxygen-containing atmosphere in an amount sufficient to provide in the medium at least one of alkali-metal peroxide and superoxide, said peroxide and superoxide functioning as substantially the sole fuel cell electrochemical oxidant, introducing into the medium an oxidizing additive capable of catalyzing at least one of said peroxide and superoxide formation and utilization in the medium, providing a hydrogen-permeable otherwise impervious anode layer, preactivating the said anode layer to increase its effective anode area, contacting one side of the preactivated anode layer with the electrolytic medium, providing a cathode with effective cathode area from about 2 to about 10 times the effective area of said anode layer in contact with the medium and with sufficient cathode activity to accommodate the increased effective anode area provided by the preactivation, applying hydrogen-containing fuel to the other side of the anode layer, and drawing current from said fuel cell while holding the said medium at such temperature and while utilizing said oxidant electrochemically to provide substantially the entire current output of the fuel cell.

2. A method as claimed in claim 1 and in which the said preactivating is effected by forming a porous increased-surface-area layer on at least the said other side of the anode layer.

3. A method as claimed in claim 1 and in which said preactivating is effected by oxidizing said anode layer, the oxide coating becoming reduced by the hydrogen fuel to a porous increased-surface-area layer.

4. A method in accordance with claim 1, wherein an oxygen-containing gas is fed to said medium in the region of the cathode to promote the formation or utilization of said peroxide and superoxide, and said additive increases the utilization of said gas.

* * * * *